United States Patent
Moore

[11] 3,868,190
[45] Feb. 25, 1975

[54] MOUNTING ASSEMBLY FOR VEHICLE ROLLOVER PROTECTIVE SYSTEMS WITH PRELOADED CUSHIONING MEMBER

[75] Inventor: James C. Moore, Clackamas, Oreg.
[73] Assignee: Portland Wire & Iron Works, Portland, Oreg.
[22] Filed: Oct. 16, 1972
[21] Appl. No.: 297,743

[52] U.S. Cl............ 403/189, 280/150 C, 296/102, 403/224
[51] Int. Cl............................................. F16b 9/02
[58] Field of Search.................. 287/20 R, 56, 85 R; 248/15, 24, 22, 25; 280/150 C, 102; 296/28 R, 102, 1 R; 403/224, 226, 227, 189

[56] References Cited
UNITED STATES PATENTS

| | | | |
|---|---|---|---|
| 3,223,374 | 12/1965 | Butler et al. | 248/22 X |
| 3,437,301 | 4/1969 | Newberry et al. | 287/85 R X |
| 3,473,431 | 10/1969 | King | 287/189.36 F X |
| 3,476,340 | 11/1969 | Gruner | 248/22 |
| 3,560,019 | 2/1971 | Moore | 287/85 R |
| 3,560,034 | 2/1971 | Hipsher et al. | 287/85 R |
| 3,687,404 | 8/1972 | Werner | 287/85 R |

Primary Examiner—Jordan Franklin
Assistant Examiner—Wayne L. Shedd
Attorney, Agent, or Firm—Dawson, Tilton, Fallon & Lungmus

[57] ABSTRACT

Upright tubular columns for a rollover protective system are mounted to a vehicle by means of shock-absorbing and sound-isolating mounts which include a pedestal secured to the vehicle and adapted to be received with the column with a clearance space between the pedestal and inside wall of the column. A resilient cushioning member is interposed between the base of the column and the pedestal; and means are included to induce a preload on the resilient cushioning member. Impact loads are thus more evenly distributed to the cushioning member, and the deflection characteristics are changed to make the connection more rigid.

2 Claims, 3 Drawing Figures

PATENTED FEB 25 1975 3,868,190

MOUNTING ASSEMBLY FOR VEHICLE ROLLOVER PROTECTIVE SYSTEMS WITH PRELOADED CUSHIONING MEMBER

BACKGROUND AND SUMMARY

The present invention relates to construction equipment or vehicles such as loaders, tractors, graders, bulldozers, compactors and scrapers (collectively referred to as "construction vehicles" herein); and more particularly, to the protective canopy which surrounds and covers an operator's station to shield him from falling debris and to protect him in the event of rollover. These canopy systems have become known in the art as Rollover Protection Systems or ROPS.

In order to be effective, a ROPS system should be of sufficient strength, as an absolute minimum, to support the weight of the vehicle; and more recently, minimum performance criteria have been developed by the Society of Automotive Engineers for ROPS. The trend, thus, has been toward more reliable systems and greater protection for the operator from a safety standpoint. In addition, however, there has been an increased tendency to more completely control the environment of the operator, including enclosing the operator's station to provide a cab for him. One enclosed guard canopy for tractors is described in the co-owned U.S. Pat. No. 3,572,819 of James C. Moore and Milton K. Leonard, issued March 31, 1971. In this manner, not only is the operator protected from safety hazards, but the environment of the cab can be controlled to shield the operator against rain, to cool the cab in hot climates, and to filter the air the operator breathes in dusty environments. The vehicle thus becomes an all-weather vehicle.

Noise is another factor against which it is desired to protect an operator, from the viewpoints of both comfort and safety. Normally, construction vehicles or tractors of the type with which the present invention are concerned are quite large and accommodate a large power plant. The noise due to vibration can be serious. The noise problem becomes increased when the operator is enclosed within a cab because the enclosing panels are normally mounted directly to the frame of the rollover protective system. The panels may act as diaphragms to give a "drum" effect in transmitting vibration from the transmission and power plant through the vehicle frame and the frame of the rollover protective system to the enclosing wall panels of the operator's cab. Such noise, if not protected against, would severely limit the usefulness of the vehicle by restricting the time period during which a person may operate the vehicle without danger to his hearing.

Thus, so-called vibration mounts have been developed for attaching the upright columns of the frame of a rollover protective system to the main frame of the vehicle to provide acoustical isolation between the rollover protective system and the operator-enclosing panels on the one hand, and the vehicle and vehicle frame on the other. One type of vibration-reducing mount for a rollover protective system is disclosed in the co-owned U.S. Pat. No. 3,623,754 of James C. Moore entitled "Cushioning Mounting Assembly for Vehicle Guard Canopy Post," issued Nov. 30, 1971; and another vibration mount is disclosed in co-owned U.S. Pat. No. 3,560,019 of James C. Moore entitled "Shock-Cushioning Mounting Means for Canopies or Heavy Equipment," issued Feb. 2, 1971. The present invention relates to improvements in vibration mounts disclosed in these latter two patents.

Even though the vibration mounts in the above-identified patents represent substantial improvements over what had gone before, I have found that under the extremely rugged conditions of use, failures have occurred both in the resilient cushioning member and in the welds in the rollover protective system. The weld failures result primarily from the reduced effectiveness of the cushioning members which, in turn, is caused by an effect which I refer to as "point" loading. Point loading occurs on the resilient cushioning member interposed between mating surfaces in the mount. One mating surface is on a pedestal welded to the vehicle frame and the other is in the base of a tubular column or post in the rollover protective system which is received on the pedestal. The pedestal and column are ordinarily connected by means of a shaft so that the connection is pivotal.

Any slack or clearance between these two mating surfaces and the interposed resilient cushioning member results in excessive loading of a small area (hence, a "point") of the cushioning member. It will be appreciated that because the tubular columns of the rollover protective system are, in effect, pivotally mounted to their associated pedestals, any small vibration in the vehicle frame results in an amplified or increased motion of the upper end of the column. This motion, which is analogous to the whipping action of a vertical stick secured only at its base, causes an extremely abrasive action on the resilient cushioning member which action is even more deleterious to the cushioning member when the resulting load is borne only by a relatively small area on the cushioning member. It is also noted that construction vehicles have very little suspension, and this fact, coupled with the rugged conditions under which they are used greatly amplifies the whipping motion of the upper portions of the posts or columns.

Thus, the cushioning member may undergo very rapid wear because of this abrasive action, and the rubbing motion on the surface of the cushioning member may also lead to a heat build-up which causes still further and more rapid degeneration in the resilient cushioning member, thus leading to a regenerative or snowballing effect causing very rapid deterioration in the ability of the cushioning member to resist high impact loads and to minimize the transmission of shock and vibration from the vehicle frame to the rollover protective system.

Once the resilient cushioning member interposed between the pedestal and the base of a column begins to wear or otherwise deteriorates, the whipping action of the columns begins to bear directly against the mounts and causes flexing of the steel members. This may also be caused by point loading--that is, the contact between the cushioning member and the mating surfaces on the column and mount is so small that the cushioning member is not able to adequately cushion the impact, and undue stress is placed on the mount. In either case, the result is a crystallization of the welds, leading to early failure.

Briefly, the present invention preloads the resilient cushioning member which is interposed between the base of the column and the pedestal.

I have discovered that by using preloaded resilient cushioning members, the cushioning members achieve a greater conformation to the shape of the pedestal and the base of the tubular column or post. The effect is to spread out the impact loading, caused by the whipping effect of the posts, over the entire surface of the cushioning members so that it operates under the conditions for which it is designed. Point impact loading is thus eliminated.

I have found that there exists a two-fold difference in the operation of the mounts when the resilient members are preloaded. The first is that before any deflection whatever is experienced, the preload force must be overcome. Secondly, even when the load is sufficient to overcome the preload force, the deflection characteristic of each mount is different in the sense that it is more resistant to deflection for comparable loads due to the fact that the load is more widely and more evenly distributed throughout the contact surfaces of the resilient cushioning member.

The present invention has the beneficial results that a tighter or stiffer fit is achieved between the columns and their associated pedestal mounts. Further, by more evenly distributing the load, the abrasive wearing and resultant heat build-up experienced before have become greatly reduced. The vibration of the columns also is greatly reduced, resulting in reduced crystallization of the welds in the ROPS system and in a significantly reduced noise level within the enclosed operator's cab. For example, in one test, the sound level reduced from 90dBA to 85dBA—a 44 per cent reduction in sound pressure levels.

Other features and advantages of the present invention will be apparent to persons skilled in the art from the following detailed description of two embodiments of my invention, accompanied by the attached drawing.

THE DRAWING

DETAILED DESCRIPTION

Figure 1:
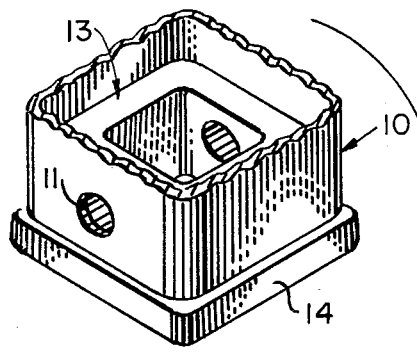
FIG. 1 is a perspective view of one mounting assembly incorporating the present invention with the parts in exploded relation.
Figure 1:
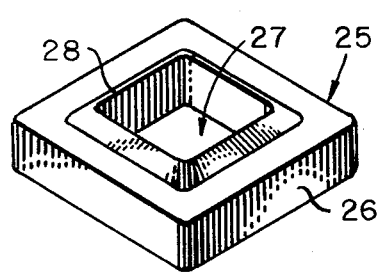
Figure 1:
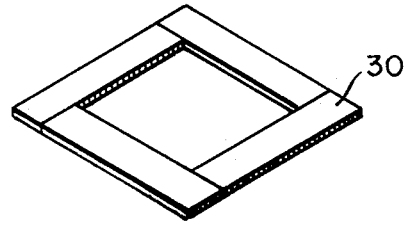
Figure 1:
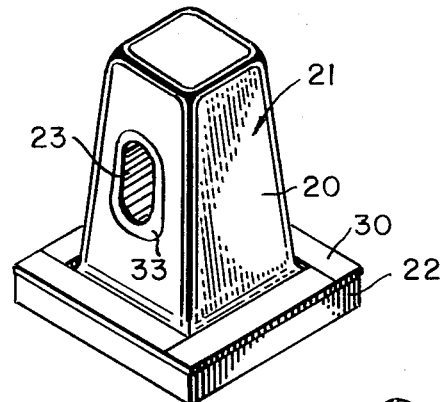
Figure 1:
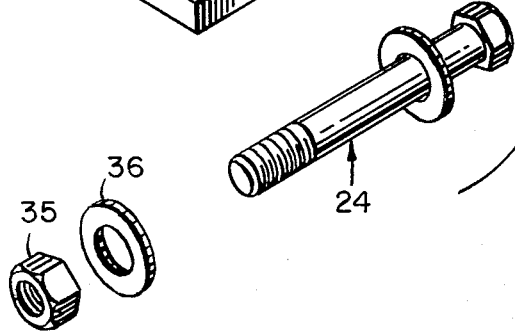
Figure 2:
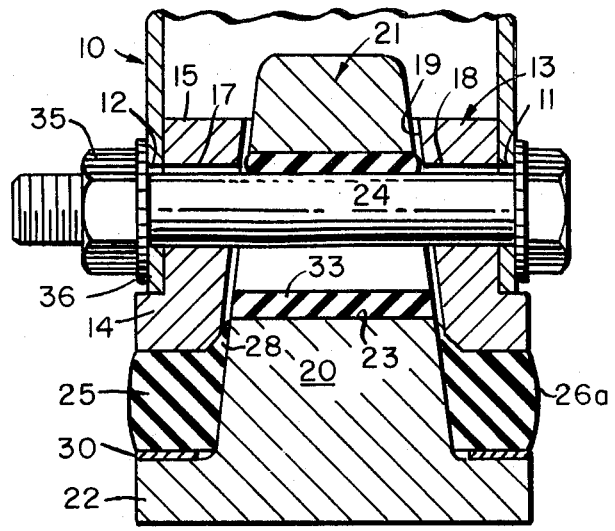
FIG. 2 is a vertical cross sectional view of the assembled mounting of FIG. 1.

Referring first to the embodiment of FIGS. 1 and 2, reference numeral 10 generally designates the lower portion of an upright tubular column comprising one element in the frame of a rollover protective system adapted to be mounted to a tractor or a construction vehicle for protecting an operator. The column 10 has a generally rectangular cross section, and opposing walls thereof are provided with apertures 11, 12.

A metal sleeve 13 including a lower peripheral flange 14 and a generally upright neck 15 is welded to the open bottom of the tube 10. The flange 14 extends horizontally beneath the lower edge of the tube 10 to provide an increased bearing surface. The neck 15 is provided with side apertures 17 and 18 aligned respectively with the apertures 12, 11 in the tube 10. In addition, the neck 15 has a central opening 19 having a generally vertical axis and a frusto-pyramidal shape. This frusto-pyramidal opening is adapted to receive an upright portion 20 of a pedestal generally designated 21. The lower portion of the pedestal 21 includes an enlarged peripheral mounting flange 22 which is welded to the frame of the vehicle. The particular cross sectional shape of the upper portion 20 of the pedestal 21 is not critical, although it preferably has a decreasing area proceeding from the base flange 22 to the truncated top.

The upright portion 20 of the pedestal 21 includes a transverse slot 23 which is elongated in the vertical direction and adapted to receive a bolt or shaft 24 while permitting relative motion of the bolt 24.

A resilient cushioning member 25 having a generally square peripheral base 26, a central aperture 27 for receiving the upright portion 20 of the pedestal 21, and a central upwardly extending lip 28 is interposed between the flange 14 of the sleeve 13 and the peripheral base 22 of the pedestal 21.

One or more fabricated shim plates 30 is interposed between the top of the base flange 22 of the pedestal 21 and the lower surface of the peripheral base 26 of the resilient cushioning member 25. One shim plates 30 is shown in assembled relation with the pedestal 21 in FIGS. 1 and 2, and one shim plate is shown in exploded relation with the cushioning member 25 and pedestal 21 in FIG. 1. The function of the shim plate or plates 30 is to induce a preload on the peripheral base 26 of the resilient cushioning member 25, as will be explained presently. A resilient liner 33 is set in the slot 23 of the pedestal 21.

In assembling the elements, the shims are first placed over the upright member 20 of pedestal 21 to rest on the base flange 22. Next, the cushioning member 25 is similarly placed and the upright column 10 is then lowered onto the cushioning member 25. Additional force is placed on the frame to lower the column 10 to induce a preload in the resilient cushioning member 25 until the apertures 11, 12 of the column 10 and the apertures 17, 18 of the sleeve 13 align with the opening 23 in the pedestal 21. The bolt 24 is then placed through the aligned apertures and secured by means of a nut 34 and washer 36. When the excess force is removed, the top portion of the bolt 24 engages the upper part of the resilient liner 33 and causes it to bulge slighly as indicated by compressing it against the upper part of the slot 23 in the pedestal 21. In addition, the sides of the base 26 of the resilient member 25 also bulge as at 26a due to the preload induced in the cushioning member 25.

As an example, in one embodiment wherein the normal distance from the top of the base flange 22 of the pedestal 21 to the bottom of the base 14 of sleeve 13 is 1-¼ in. (corresponding to an un-preloaded height of the base 26 of resilient cushioning member 25 of 1-¼ in.), shim plates were introduced to reduce this dimension to 1-⅛ in. Thus, the resilient cushioning member or pad was preloaded by approximately ⅛ in. As mentioned, I have found that by thus preloading the resilient cushioning member interposed between the pedestal mount and the upright column, noise and vibration within the cab under normal operating conditions has been greatly reduced. Further, the life of the cushioning member has been extended significantly without yielding the basic advantages of this type of mount in achieving a metal-to-metal contact between the sleeve 13 and pedestal 21 under actual rollover conditions, as explained in the above-identified U.S. Pat. No. 3,560,019.

Turning now to the second embodiment shown in the drawing, an upright tubular column or post is designated by reference numeral 40, and it may have a generally square or circular cross section. The post 40 forms one of the frame elements for a rollover protective system for a vehicle, and it is mounted to an upright pedestal generally designated by reference numeral 42 including an upright portion 43 and a welding base 44 which is adapted to be welded to the vehicle frame. A transverse aperture 45 is formed in the upright portion 43 of the pedestal 42, and it is fitted with an annular resilient cushioning member 46 and a central bolt or shaft 47 which extends likewise through corresponding apertures in the tube 40 and is secured in a manner similar to that which holds the previously discussed bolt 24. The upper portion of the pedestal 42 is provided with a vertical threaded aperture 48 which receives a bolt 49. A generally disc-shaped resilient cushioning member 50 is interposed between an upper horizontal surface 51 of the upright portion 43 of pedestal 42 and a washer or plate 52 held in place by the bolt 49. The bolt 49 is tightened into the aperture 48 to induce a preload in the cushioning member 50 which is interposed between the inner surface of the upright column 40 and the pedestal mount 42. Again, the preloading of the resilient cushioning member substantially reduces metal-to-metal contact (and thereby minimizes the transmission of noise and vibration from the vehicle frame to the opeator's cab) except under extreme conditions similar to those encountered during an actual rollover. In this case, the small annular clearance 55 between the pedestal mount 42 and the tubular column 40 is overcome and the connection greatly strengthened to resist further deflection.

Figure 3:
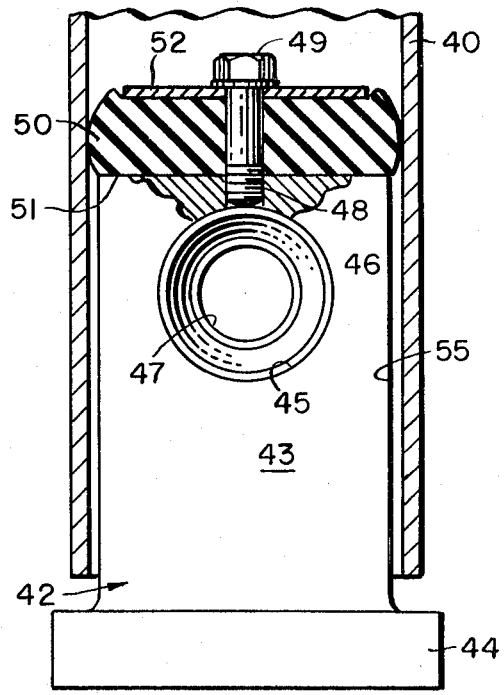
FIG. 3 is a vertical view, partly in cross section, of an alternative embodiment of the inventive mounting.

It will now be appreciated that the present invention seeks to induce a preload in a resilient cushioning member interposed between a pedestal mount secured to a vehicle and an upright tubular column for a rollover protective system. By preloading the resilient cushioning member, a predetermined force must be exerted between the two metal members before the preload is overcome and, thus, before the two metal members move relative to each other. In addition, the preloading causes all impact loads to be evenly distributed over the entire contact surface of the cushioning members; and this reduces point loading and the resulting wear and heat build-up in the cushioning member. In the case of the embodiment of FIGS. 1 and 2, the preload induced in the resilient cushioning member 25 must be overcome, and in the case of the embodiment of FIG. 3, the preload induced in the cushioning member 50 must be overcome before the upright tubular columns move relative to their associated pedestal mounts. At the same time, a clearance is maintained between the pedestal mounts and the base of the metal column; and the loading is distributed more evenly on the cushioning member.

The interposition of the preloaded resilient cushioning member, therefore, reduces noise and vibration transmitted from the vehicle to the cab, substantially reduces the effect of impact loads, and increases the useful life of the cushioning members.

Having thus described in detail separate embodiments of the present invention, persons skilled in the art will be able to modify certain of the structure which has been described and to substitute equivalent elements for those which have been disclosed while continuing to practice the principle of the invention; and it is, therefore, intended that all such modifications and substitutions be covered as they are embraced within the spirit and scope of the appended claims.

I claim:

1. A mounting assembly for securing a tubular frame member or column of a rollover protective system to a construction vehicle comprising: means at the base of said column providing a transverse aperture; a mount having a base welded to said vehicle, said mount and said column having a male-female interconnection with the male portion being an upright pedestal defining a transverse slot adapted to be aligned with said transverse aperture in said column; a sleeve received in the open bottom of said frame member and providing an interior bearing surface corresponding to and spaced at a clearance distance from the side surface of said pedestal and adapted to engage said pedestal to achieve metal-to-metal contact during rollover conditions; a resilient cushioning member with a central aperture adapted to surround said pedestal and being interposed between the base of said mount and the base of said frame member when in assembled relation therewith; a bolt received in said aligned apertures; a resilient liner interposed between said bolt and said pedestal; preload means for inducing an adjustable amount of preload on said resilient cushion member by reaction of said bolt against the pedestal; said assembly being characterized in that said resilient cushioning member is preloaded to be compressed at least about one-eighth inch when said column is assembled to said pedestal.

2. The apparatus of claim 1 wherein said preload means comprises shim means interposed between the base of said pedestal and the bottom surface of said cushioning member.

* * * * *